(12) United States Patent
Tada et al.

(10) Patent No.: US 9,901,957 B2
(45) Date of Patent: Feb. 27, 2018

(54) VIBRATION PRODUCING DEVICE AS WELL AS ELECTRONIC DEVICE AND HUMAN BODY FITTING ARTICLE BOTH EMPLOYING SUCH VIBRATION PRODUCING DEVICE

(71) Applicant: New Shicoh Technology Co., Ltd., Yamato (JP)

(72) Inventors: Junichi Tada, Yamato (JP); Hiroki Narushima, Yamato (JP); Yoshitaka Mori, Yamato (JP)

(73) Assignee: NEW SHICOH TECHNOLOGY CO., LTD., Yamato, Kanagawa Pref. (JP)

( * ) Notice: Subject to any disclaimer, the term of this patent is extended or adjusted under 35 U.S.C. 154(b) by 636 days.

(21) Appl. No.: 14/477,140

(22) Filed: Sep. 4, 2014

(65) Prior Publication Data

US 2015/0061462 A1   Mar. 5, 2015

(30) Foreign Application Priority Data

Sep. 5, 2013  (JP) ................................ 2013-184036

(51) Int. Cl.
| H01L 41/08 | (2006.01) |
| B06B 1/12 | (2006.01) |

(Continued)

(52) U.S. Cl.
CPC ................ B06B 1/12 (2013.01); B06B 1/06 (2013.01); H02N 2/025 (2013.01)

(58) Field of Classification Search
CPC .................................... H02N 2/25; B06B 1/06

(Continued)

(56) References Cited

U.S. PATENT DOCUMENTS

| 5,170,088 A | * | 12/1992 | Naito | ....................... H01H 3/22 |
| | | | | 200/181 |
| 9,064,633 B2 | * | 6/2015 | Siggel | .................. C07D 471/10 |
| 2011/0101796 A1 | * | 5/2011 | Odajima | ................ H02K 33/16 |
| | | | | 310/25 |

FOREIGN PATENT DOCUMENTS

| CN | 102055299 A | 5/2011 |
| CN | 103186282 A | 7/2013 |

(Continued)

OTHER PUBLICATIONS

Office Action dated Jan. 9, 2017 in corresponding Chinese Patent Application No. 201410076927.3 (9 pages).

*Primary Examiner* — Thomas Dougherty
*Assistant Examiner* — Karen B Addison
(74) *Attorney, Agent, or Firm* — Buchanan Ingersoll & Rooney PC (57) ABSTRACT

The vibration producing device includes a driving shaft being placed under slight rapid vibratory movements in its axial direction, a slight rapid vibratory movements producing member coupled with one end of the driving shaft for causing the driving shaft to be vibrated with the slight rapid vibratory movements, a casing for supporting at least either the driving shaft or the slight rapid vibratory movement producing member in such a manner that the driving shaft can be vibrated with the slight rapid vibratory movements in its axial direction, and a weight member to be coupled with the driving shaft in order to permit the weight member to move in its axial direction under the slight rapid vibratory movements of the driving shaft, wherein the casing is vibrated by allowing the weight member to be moved forwards and backwards alternately along the driving shaft in its axial direction.

13 Claims, 9 Drawing Sheets

(51) Int. Cl.
*B06B 1/06* (2006.01)
*H02N 2/02* (2006.01)

(58) Field of Classification Search
USPC .................. 310/323.16, 328, 355, 311, 325
IPC ........................ H01L 41/09, 41/08; H02N 2/00
See application file for complete search history.

(56) References Cited

FOREIGN PATENT DOCUMENTS

| | | | |
|---|---|---|---|
| JP | 2011-97747 A | 5/2011 | |
| JP | 2011-245437 A | 12/2011 | |
| JP | 2013-134715 A | 7/2013 | |

\* cited by examiner

VIBRATION PRODUCING DEVICE AS WELL AS ELECTRONIC DEVICE AND HUMAN BODY FITTING ARTICLE BOTH EMPLOYING SUCH VIBRATION PRODUCING DEVICE

BACKGROUND OF THE INVENTION

Field of the Invention

The present invention relates to a vibration producing device designed for use with an input unit such as the touch panel display or the like. The present invention also relates to an electronic device and a human body fitting article both having such vibration producing device integrated therein.

Description of the Relevant Art

As it is known in the conventional prior art, there is an input unit that includes a display in which a touch panel function is incorporated or an input unit on which the operating keys are provided. Among those input units, there is one input unit in which a vibration producing device is previously incorporated and which enables an operator to enter information by pressing the appropriate keys with a finger or a pen. In response to the information thus entered, the input unit will activate the vibration producing device to produce the corresponding vibrations that are returned and imparted to the finger or the pen, thus providing the operator with the impression that the information has been entered surely and correctly. As one example of such vibration producing device, Patent Document 1 discloses the vibration producing device that includes a base, a piezoelectric actuator having one end thereof connected to the base and a weight connected to the other end of the piezoelectric actuator through a damper. The conventional structure described above allows the vibration producing device to be made thin.

RELEVANT TECHNICAL DOCUMENTS

Patent Document

Patent Document 1: Japanese unexamined patent publication No. 2011-245437

SUMMARY

In the vibration producing device disclosed in Patent Document 1, however it can be made thin, it is difficult to make its physical size as small as possible as it is viewed in plane, since a weight having a particular length of such as several ten millimeters (mm) is required in order to provide the desired vibrations.

In light of the problems associated with the vibration producing device described above, one object of the present invention is to solve those problems and therefore to provide a vibration producing device designed for making its physical size as small as possible as it is viewed in plane. Another object of the present invention is to provide an electronic device and a human body fitting article both equipped with such vibration producing device.

In order to accomplish the first mentioned object, the present invention provides a vibration producing device which comprises:
a driving shaft being placed under the slight rapid vibratory movements in its axial direction;
a slight rapid vibratory movements producing member coupled with one end of said driving shaft for causing said driving shaft to be vibrated with the slight rapid vibratory movements;
a casing for supporting at least either of said driving shaft and said slight rapid vibratory movements producing member in order to permit said driving shaft to be vibrated with the slight rapid vibratory movements in its axial direction; and
a weight member to be coupled with said driving shaft so as to be movable in the axial direction of said driving shaft by causing said driving shaft to be placed under said slight rapid vibratory movements,
wherein said weight member allows said casing to produce the vibration by moving forwards and backwards along the axial direction of said driving shaft.

In order to accomplish the second mentioned object, the present invention provides an electronic device and a human body fitting article, both of which are equipped with the above described vibration producing device.

The objects intended by the present invention can be accomplished by the vibration producing device as well as the electronic device and the human body fitting article both equipped with such vibration producing device.

One advantage of the present invention is in providing the vibration producing device designed for making its physical size as small as possible as it is viewed in plane. Another advantage of the present invention is in providing the electronic device and the human article fitting article both equipped with such vibration producing device.

BRIEF DESCRIPTION OF THE DRAWINGS

FIG. 5 (*a*) to FIG. 5 (*f*) represent the examples of the configuration relationship between the casing and the slight rapid vibratory movements producing member of the vibration producing device in accordance with the embodiment 2 of the present invention as it is viewed from the bottom;

FIG. 7 (*a*) is a longitudinal sectional view illustrating the example 2 of the weight member in accordance with the embodiment 3 of the present invention with some parts or elements being omitted, and FIG. 7 (*b*) is a plan view illustrating its support;

BEST MODES OF EMBODYING THE INVENTION

Some embodiments of the present invention will be described below by referring to the accompanying drawings.

It may be appreciated that the present invention is not limited to the following embodiments but may be modified in numerous ways without departing from the spirit and scope of the invention derived from the descriptions of the appended claims.

Embodiment 1

The vibration producing device in accordance with the embodiment 1 of the present invention is now described by using the relevant figures in the accompanying drawings. In those relevant figures, it is supposed that the upper side of the paper corresponds to the top of the device whereas the lower side of the paper corresponds to the bottom of the device.

Figure 1:
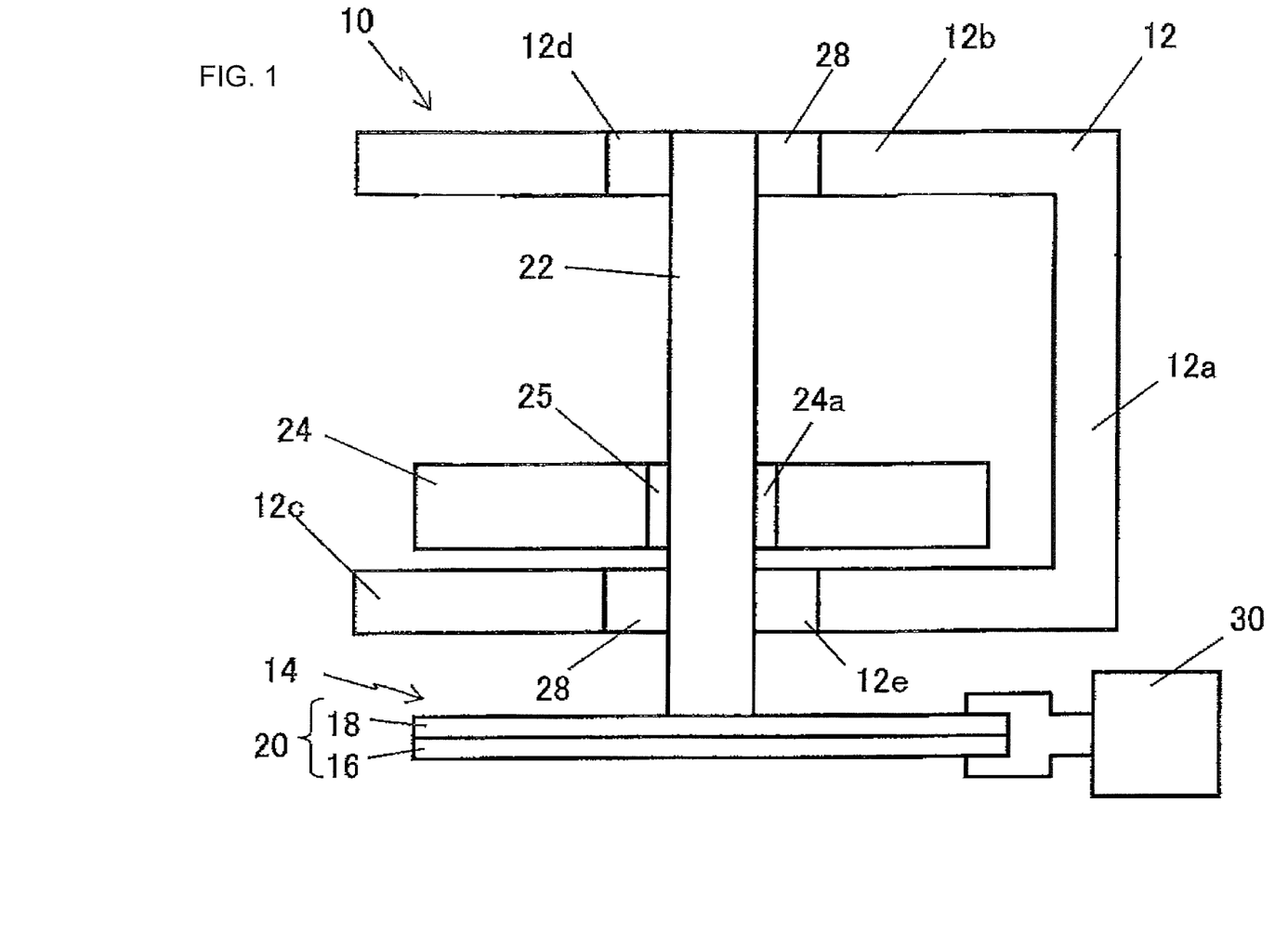
FIG. 1 is a longitudinal sectional view illustrating the structure of the vibration producing device in accordance with one embodiment 1 of the present invention.

The vibration producing device 10 shown in FIG. 1 is designed for use with any type of an electronic device including a display in which the touch panel function is integrated or any type of an electronic device such as an input unit on which the operating keys are provided. Among those types of the electronic device, there is one type of electronic device in which the vibration producing device 10 is previously integrated and which enables an operator to enter information by pressing the appropriate keys with a finger or a pen. In response to the information thus entered, the input unit will activate the vibration producing device to produce the corresponding vibrations that are returned and imparted to the finger or the pen, thus providing the operator with the impression that the information has been entered surely and correctly.

As shown in FIG. 1, the vibration producing device 10 in accordance with the embodiment 1 includes a driving shaft 22, a slight rapid vibratory movements producing member 20, a casing 12 and a weight member 24.

The driving shaft 22 may be vibrated with the slight rapid vibratory movements in its axial direction. That is, the slight rapid vibratory movements of the driving shaft 22 in its axial direction is the slight rapid vibratory movements in its axial direction moving the driving shaft 22 forwards and backwards alternately and asymmetric ally.

As it is used in the present invention, the term of the slight rapid vibratory movements moving the driving shaft forwards and backwards alternately and asymmetrically should be understood to mean the vibrations with the smallest amplitude that may be produced when the driving shaft moves in one axial direction and in the other axial direction alternately and the speeds of the driving shaft moving in one axial direction and in the other axial direction are different. The slight rapid vibratory movements is abbreviated as the micro-vibration.

The driving shaft 22 has its one end coupled with the slight rapid vibratory movements producing member (the micro-vibration producing member) 20. The micro-vibration producing member 20 is provided for causing the micro-vibration of the driving shaft 22 moving forwards and backwards alternately and asymmetrically in its axial direction.

The casing 12 is provided for supporting at least either the driving shaft 22 or the micro-vibration producing member 20 so that the driving shaft 22 can be micro-vibrated in its axial direction. In the embodiment shown and described, the casing 12 is provided to support the driving shaft 22 so that it can be micro-vibrated in its axial direction.

In the embodiment shown in FIG. 1, the driving shaft 22 has its bottom end coupled with the micro-vibration producing member 20. And the micro-vibration producing member 20 is supported by the casing 21 only through the driving shaft 22.

The weight member 24 is coupled with the driving shaft 22 so that the weight member 24 can move along the driving shaft 22 in its axial direction by the micro-vibration of the driving shaft 22. Thereby, the weight member 24 moves forwards and backwards alternately along the driving shaft 22 in its axial direction.

When the weight member 24 is moving forwards and backwards alternately along the driving shaft 22 in its axial direction, the movement of its center of gravity forwards and backwards alternately causes the casing 12 to be vibrated.

The casing 12 may be made of any suitable single metal or metal alloy that has the property of transmitting the vibrations easily.

As this will be described later, when a particular voltage is applied across the micro-vibration producing member 20, it will cause the micro-vibration of the driving shaft 22 moving forwards and backwards alternately and asymmetrically in its axial direction. Then, every one stroke of this micro-vibration will cause the weight member 24 to be moved slightly toward the upward or downward direction as shown in FIG. 1. This movement will be repeated so rapidly that the weight member 24 can be moved very rapidly toward the upward or downward direction. In this way, the weight member 24 will allow the casing 12 to be vibrated by causing the center of gravity of the weight member 24 to reciprocate while the weight member 24 is moving forwards and backwards alternately along the driving shaft 22 in the axial direction of the driving shaft 22.

Those vibrations generated in the casing 12 will be transmitted to the electronic device mentioned above, from which the vibrations will be transmitted to operator to provide the operator with the impression that the operation has been made surely and correctly.

As the before described, relatively large vibrations can be caused by the present embodiment without making the size of weight member 24 so large. Advantageously, therefore, the vibration producing device 10 can be made as small as possible as it is viewed in plane.

The vibration producing device 10 may be constructed such that it can have the physical dimensions of several mm or one cm in square and several mm in height. And, relatively large vibrations can be caused and obtained without making the size of weight member 24 so large. This provides the advantage in that the vibration producing device 10 can be made as small as possible as it is viewed in plane.

The structure of the vibration producing device 10 in accordance with the embodiment 1 will be described below in further detail.

The casing 12 has a through hole 12d formed on its upper wall 12b and a through hole 12e formed on its lower wall 12c. The driving shaft 22 may be inserted through those through holes 12d, 12e by means of corresponding bushings 28, 28 being fitted inside the through holes 12d, 12e.

Those through holes 12d, 12e are aligned with each other so that the center line extending at the center of through holes 12d, 12e is vertical with respect the corresponding upper wall 12b and lower wall 12c.

A driving member 14, which permits the weight member 24 to move, may be comprised of the micro-vibration producing member 20 and the driving shaft 22.

The micro-vibration producing member 20 is made of a thin plate that includes an elastic thin plate 18 and a flexible thin plate 16 disposed on at least one side of the elastic thin plate 18. When the driving voltage is applied across the flexible thin plate 16, the flexible thin plate 16 will expand or contract itself, causing the center portion and the circumferential edge portion of the flexible thin plate 16 to be displaced relative to each other in the normal direction of the elastic thin plate 18. This will allow the micro-vibration producing member 20 to become deformed like the bow shape.

In the current embodiment 1, the micro-vibration producing member 20 is comprised the elastic thin plate 18 and the flexible thin plate 16 disposed on the one side of the elastic thin plate 18, which may be so called as the unimorph form.

The flexible thin plate 16 may be made of any suitable piezoelectric material or electrostriction material having an electrode material attached to each of both sides thereof. As examples of the electrode material, it may include copper, copper alloy and the like. As an example of the piezoelectric material or electrostriction material, it may include lead zirconate titanate, barium titanate, lead magnesium niobate and the like. The flexible thin plate 16 may be formed like the round shape, polygonal shape and the like.

The elastic thin plate 18 may be made of any suitable elastic material such as copper, copper alloy and the like. In the case where the flexible thin plate 16 is disposed on one side of the elastic thin plate 18 as shown in FIG. 1, it is preferred that the elastic thin plate 18 should have the external shape that correspond to the flexible thin plate 16. This is not required, however.

The flexible thin plate 16 may be rigidly fixed to the elastic thin plate 18 by means of any suitable electrically conductive adhesive agent, for example. The micro-vibration producing member 20 has a wire disposed on each of both sides thereof for applying the voltage across the flexible thin plate 16. Those wires may be connected to a drive control portion 30.

As the micro-vibration producing member 20 is made of a thin plate, the vibration producing device 10 itself may also be made thin.

The driving shaft 22 may be made of any suitable material having the light weight and the high rigidity such as the material of the carbon group, and may be formed like the column shape.

The driving shaft 22 has its one end coupled with the micro-vibration producing member 20. In the embodiment shown and described, the driving shaft 22 has its base end rigidly fixed to the center axis of the micro-vibration producing member 20. As one of the fixing forms, for example, the base end of the driving shaft 22 may be rigidly fixed to the surface of the micro-vibration producing member 20 by means of the adhesive agent.

In the current embodiment 1, the base end of the driving shaft 22 has the thickness that is substantially the same as the center portion thereof, but may be diametrically smaller than the center portion thereof.

Instead of the structure in which the base end of the driving shat 22 is rigidly fixed to the micro-vibration producing member 20, the structure may be such that the micro-vibration producing member 20 has a through hole formed thereon and the lateral portion of the base end of the driving shaft 22 is rigidly fixed to the micro-vibration producing member 20.

As described above, the driving shaft 22 is supported by the casing 12 to allow the driving shaft 22 to micro-vibrate by means of the bushing 28.

The bushing 28 may be made of any elastic material such as rubber in order to support the driving shaft 22 and has a center hole formed thereon through which the driving shaft 22 can be passed.

The bushing 28 fitted in the through hole 12d is provided such that the distal end of the driving shaft 22 can be adhesively fixed inside the center hole of the bushing 28. The distal end of the driving shaft 22 is located on the side opposite to the base end side on which the micro-vibration producing member 20 is rigidly fixed.

The bushing 28 fitted in the through hole 12e on the other hand, is not used for adhesively fixing the driving shaft 22 inside the center hole but is only used for supporting the driving shaft 22 by pressing it from the outside.

The structure described above allows the driving shaft 22 to micro-vibrate in its axial direction, but it does not allow the driving shaft 22 itself to move over the long distance as the weight member 24 does when the driving shaft 22 is micro-vibrating.

The weight member 24 causes the casing 12 to vibrate by moving forwards and backwards alternately along the driving shaft 22 in its axial direction. It is preferred that the weight member 24 should have the comparatively great amount of mass since it supplies the vibrating energy to the casing 12 in the manner described above.

It is preferred, therefore, that the weight member 24 should be made of any of the materials having the great density such as the tungsten alloy, for example. The reason for this is that the weight member 24 not only should supply the greater vibrating energy to the casing 12 but also should be made of the material whose density is great enough to make the vibration producing device 10 as small as possible.

The weight member 24 has the external shape such as the round, polygonal and any other shapes as it is viewed in plane.

As described above, the weight member 24 is coupled with the driving shaft 22 so that the weight member 24 can move forwards and backwards alternately along the driving shaft 22 in its axial direction by the micro-vibration of the driving shaft 22 moving forwards and backwards alternately and asymmetrically. The weight member 24 and the driving shaft 22 may be coupled with each other by means of the frictional coupling, for example.

In the embodiment shown and described, the weight member 24 has a through hole 24a formed in the center thereof, through which the driving shaft 22 can be passed.

The gap that may exist between the inner wall of the through hole 24a and the outer wall of the driving shaft 22 is filled with the heat shrinkable resin material 25 that has been heat shrunk. The weight member 24 may be coupled with the driving shaft 22 by utilizing the heat shrinkable action of the heat shrinkable resin material 25. The weight member 24 and the driving shaft 22 are thus coupled by the frictional coupling. It is noted here that the heat shrinkable action of the heat shrinkable resin material 25 provides the frictional action that presses the driving shaft 22 from the outside.

The heat shrinkable action of the heat shrinkable resin material 25 that fills the gap between the inner wall of the through hole 24a and the outer wall of the driving shaft 22 acts as the frictional coupling as described above. By utilizing this frictional coupling, therefore, the structure can be simplified and the number of component parts can be reduced accordingly. In addition, all of the parts surrounding the driving shaft 22 can be made so uniformly that the driving shaft 22 can be disposed on the center of the weight member 24 and the symmetrical configuration can be implemented.

The drive control portion 30 provides a driving voltage having the particular waveforms and which is applied across the flexible thin plate 16. The waveforms of the driving voltage include the square or rectangular waveform, the sawtooth waveform, the triangular waveform that rise and fall at different timings and any other waveforms of about several ten kHz.

In the manner described so far, the micro-vibration of the driving shaft 22 moving forwards and backwards alternately and asymmetrically in its axial direction is produced, and the weight member 24 will be moved toward the upper wall 12*b* of the casing 12 and toward the lower wall 12*c* thereof while the slight movement of the weight member 24 along the driving shaft 22 in its axial direction repeats so rapidly.

Next, the process for manufacturing the vibration producing device 10 in accordance with the embodiment 1 is described below.

As a first step, the micro-vibration producing member 20 is provided by rigidly fixing the flexible thin plate 16 having the electrode formed on each of both sides thereof to the elastic thin plate 18 by means of the electrically conductive adhesive agent or the like.

As a second step, the driving member 14 is provided by rigidly fixing the driving shaft 22 to the micro-vibration producing member 20.

As a third step, the driving shaft 22 is inserted through the through hole 12*e* on the casing 12, through the through hole 24*e* on the weight member 24 and then through the through hole 12*d* on the casing 12, and is supported by the respective bushings 28 that are filled inside the corresponding through holes. The weight member 24 is thus frictionally coupled with the driving shaft 22 by means of the heat shrinkable resin material 25.

As a final step, the wires are disposed on both sides of the micro-vibration producing member 20 so that they can be connected to the drive control portion 30.

Now, the operation of the vibration producing device 10 in accordance with the embodiment 1 is described below.

When the driving voltage is started up, the flexible thin plate 16 will be expanded toward its thickness direction and will be contracted toward its in-plane direction while the elastic thin plate 18 remains to be unexpanded. So that, the micro-vibration producing member 20 will have its center portion to become deformed upwardly with the circumferential edge portion becoming deformed downwardly.

The driving shaft 22 whose base end is rigidly fixed to the center portion of the micro-vibration producing member 20 will also be moved upwardly and the weight member 24 coupled with the driving shaft 22 will also be moved upwardly.

Upon reaching its particular voltage level Vd, the driving voltage will fall rapidly and the deformation of the micro-vibration producing member 20 will also be restored to its original shape rapidly.

This is followed by causing the driving shaft 22 to be moved back to its original position while the weight member 24 will not follow that rapid downward movement of the driving shaft 22 and will remain in its position.

Through the complete sequence of the above described operation, the weight member 24 will be moved upwardly by a little degree.

This micro-vibration of the driving shaft 22 moving forwards and backwards and asymmetrically in its axial direction may move the weight member 24 upwardly by one μm to several μm on every one movement of the driving shaft 22 moving forwards and backward.

The sequence of the operation described above will be repeated with a frequency of several ten kHz.

When the weight member 24 is to be moved downwardly, the driving voltage waveform is changed so that the movement of the driving shaft 22 in its axial direction can be reversed from the upward to the downward. In this way, the weight member 24 will move forwards and backwards alternately along the driving shaft 22 in its axial direction.

As an advantage, therefore, the vibration producing device 10 in the embodiment 1 can provide the great amount of vibrations even if the size of the weight member 24 is not increased, and can be made as small as possible as it is viewed in plane.

In the embodiment shown and described, the micro-vibration producing member 20 is supported by the casing only through the driving shaft 22.

Accordingly, the micro-vibration provided by the micro-vibration producing member 20 can be transmitted to the driving shaft 22 without being absorbed by the other members such as the casing 12. This allows the driving shaft 22 to be micro-vibrated more greatly.

In the embodiment 1, the casing 1 can be made by bending a single plate into any desired shape. In this case, the through hole 12*d*, 12*e* may be previously provided or may be provided after the casing 1 is completed. The casing 12 may be formed into any other shape.

Figure 2:
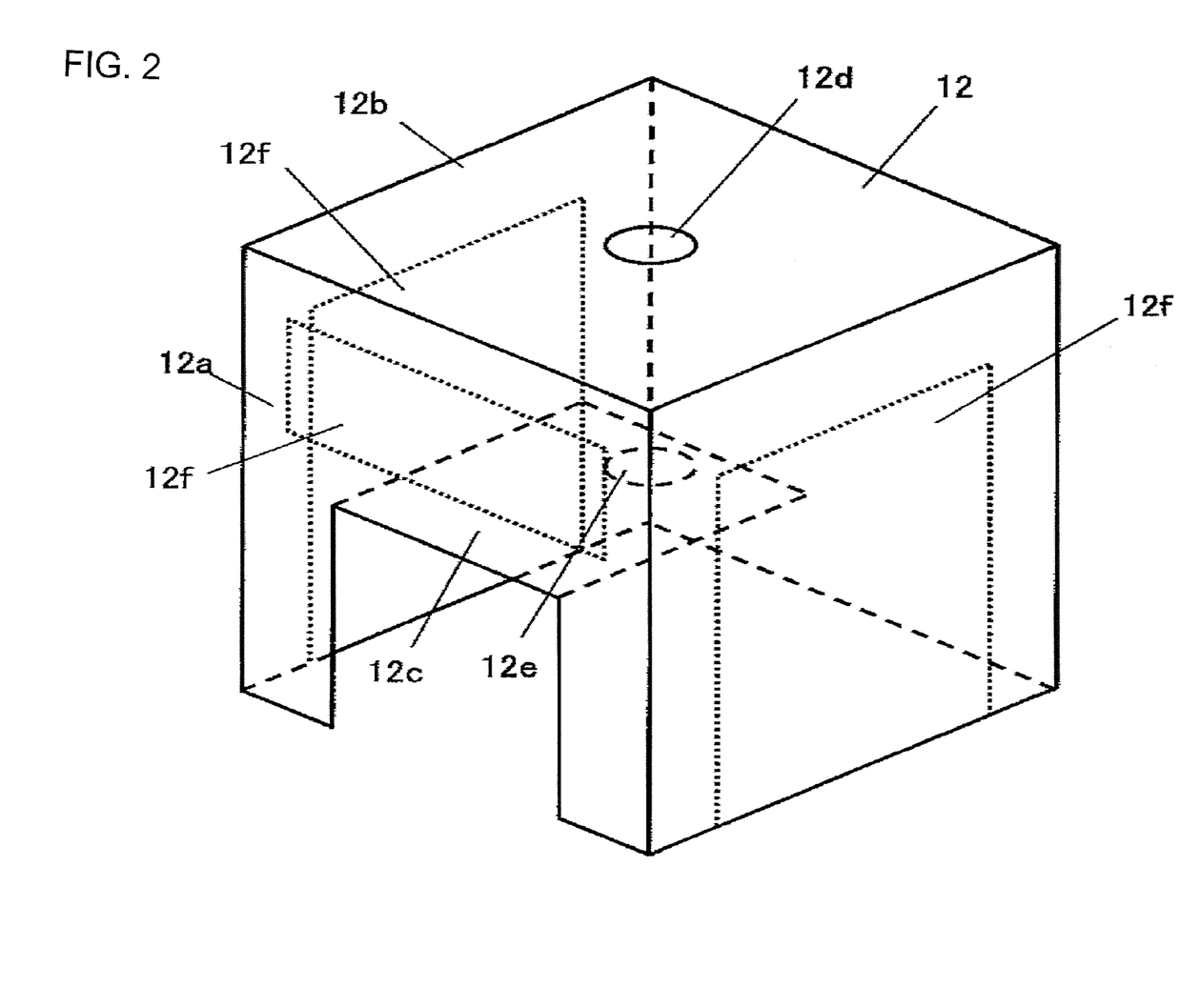
FIG. 2 is a fluoroscopic perspective view illustrating another form 1 of the casing for the vibration producing device in accordance with the embodiment 1 of the present invention.

As shown in FIG. 2, for example, the casing 12 may be formed into a box shape with no bottom, and may have one lateral wall 12*a* that is cut open and the lower wall 12*c* may be formed by bending so that it can be placed in parallel with the upper wall 12*b*. Then, the through holes 12*d*, 12*e* may be provided separately.

When the casing 12 is formed into the box shape described above, it can have the rigidity that is greater than the casing 12 described by using FIG. 1, and can permit the vibration producing device 10 to provide a greater amount of vibrations to be transmitted to the electronic device.

In this case, it is preferred that any undesired portions may be cut out as indicated by the dotted lines, thereby proving an opening 12*f*. In this way, the weight of the vibration producing device 10 can be reduced and the casing 12 can easily accommodate the component parts such as the weight member 24 and the like. This permits the easy assembly of those component parts.

Figure 3:
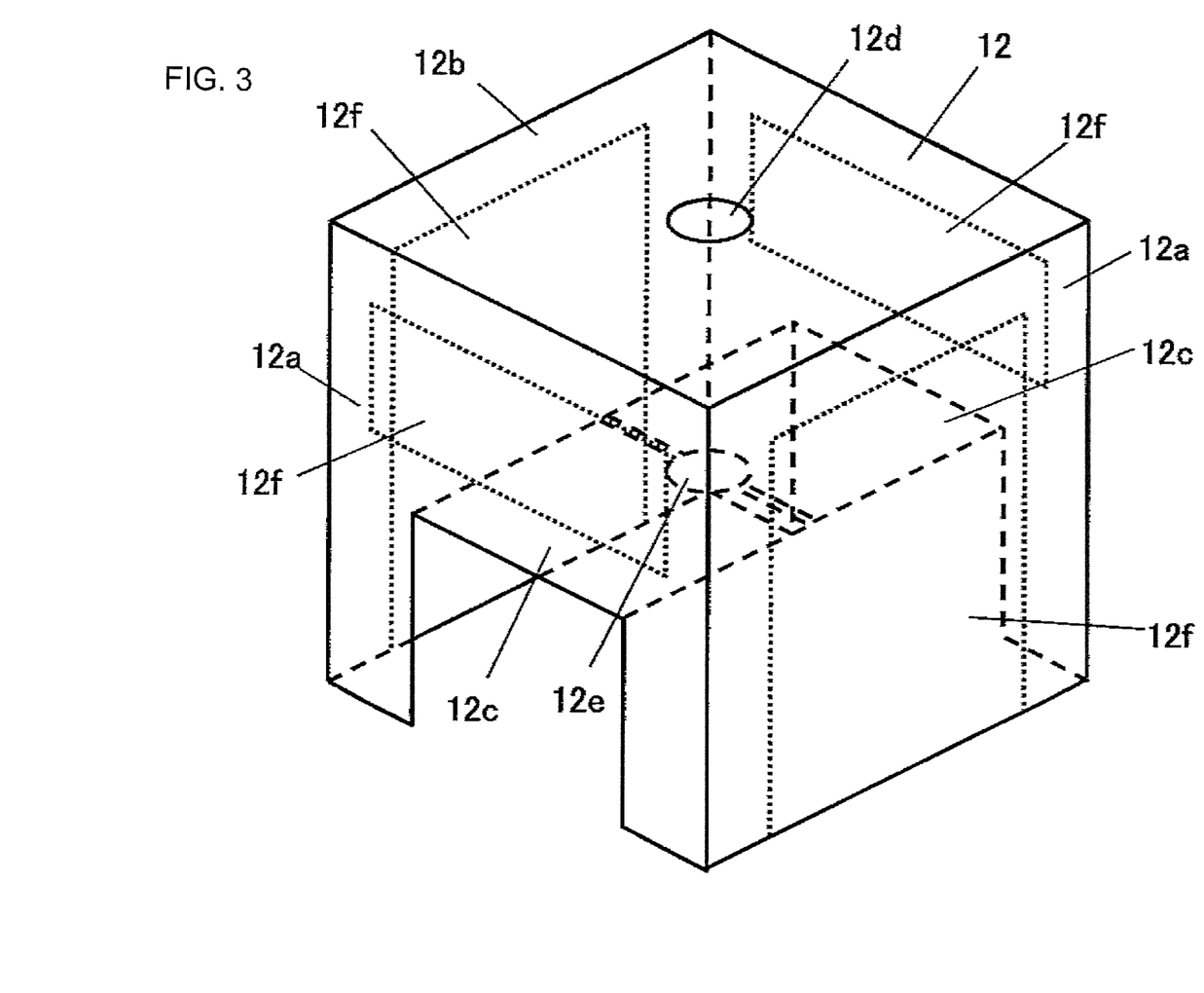
FIG. 3 is a fluoroscopic perspective view illustrating another form 2 of the casing for the vibration producing device in accordance with the embodiment 1 of the present invention.

Alternatively, as shown in FIG. 3, for example, it is preferred that the casing 12 may be formed into the box shape like the one shown in FIG. 2 and that the lateral walls 12*a*, 12*a* opposite to each other may be cut open and the lower walls 12*c*, 12*c* may be formed by bending so that the lower walls 12*c*, 12*c* can be placed in parallel with the upper wall 12*b*. In this case, the lower walls 12*c*, 12*c* may be provided such that the lower end portions before the lower walls 12*c*, 12*c* are cut open can abut against each other after bending. It is also preferred that the lower walls 12*c*, 12*c* may be provided such that the lower end portions before the lower walls 12*c*, 12*c* are cut open are previously cut out, thereby providing an opening 12*e* when the lower end portions are bent. The through hole 12*d* may be provided separately.

It is preferred that the opening 12*f* should be provided as described in FIG. 2. The end portion of the lateral wall 12*a* may be cut out when the box-like casing 12 is made, and the through hole 12e can also be provided by bending the lateral walls 12a, 12a. The casing 12 can thus be made easily.

Embodiment 2

Next, the vibration producing device in accordance with the embodiment 2 of the present invention will be described below by referring to the appropriate figures in the accompanying drawings. It is noted, however, that those component parts which are similar to those in the embodiment 1 are given like reference numerals. The description of those component parts is omitted to avoid the duplicate description.

Figure 4:
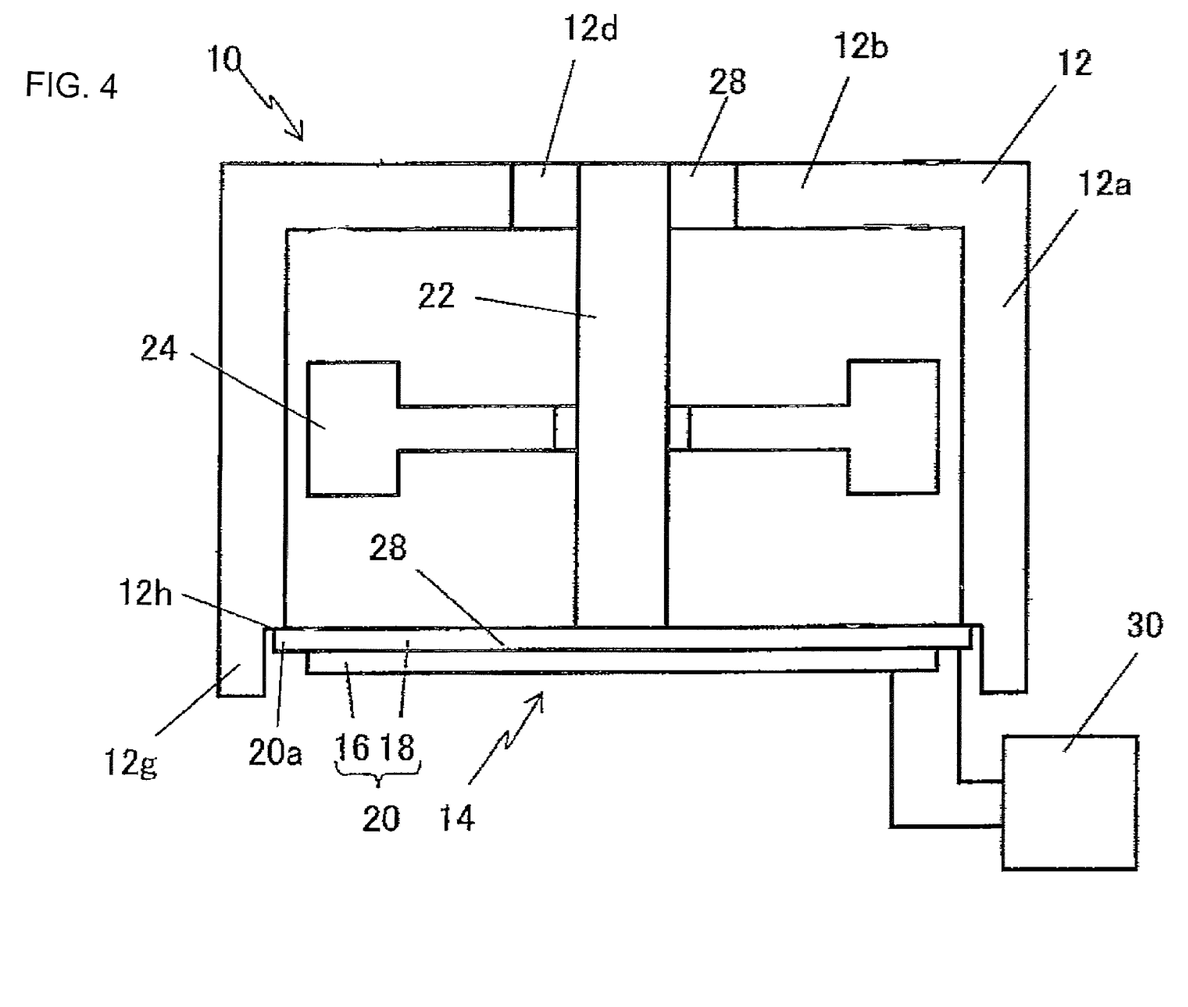
FIG. 4 is a longitudinal sectional view illustrating the structure of the vibration producing device in accordance with the embodiment 2 of the present invention.
Figure 5A:
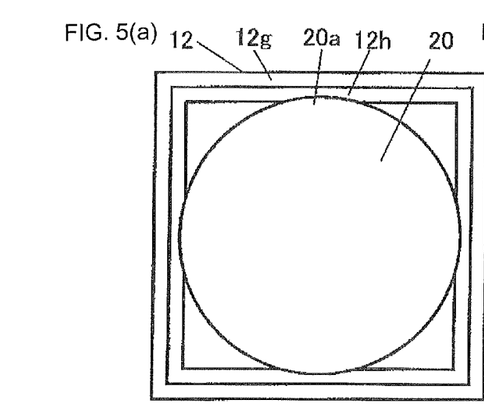
Figure 5B:
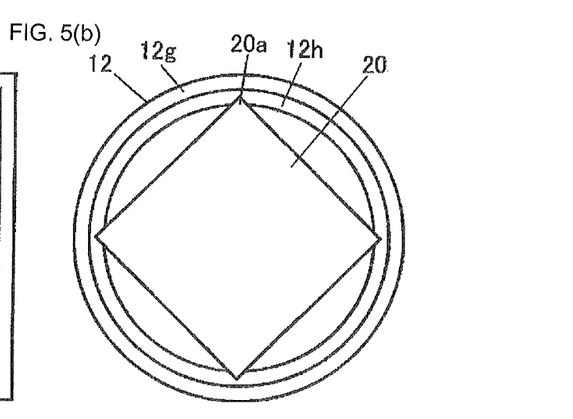
Figure 5C:
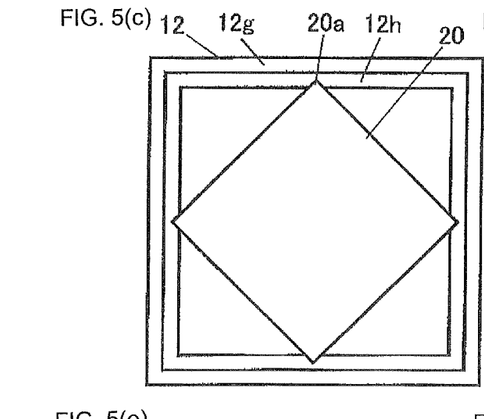
Figure 5D:
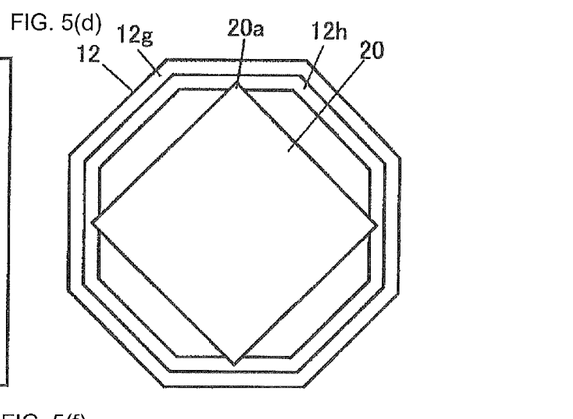
Figure 5E:
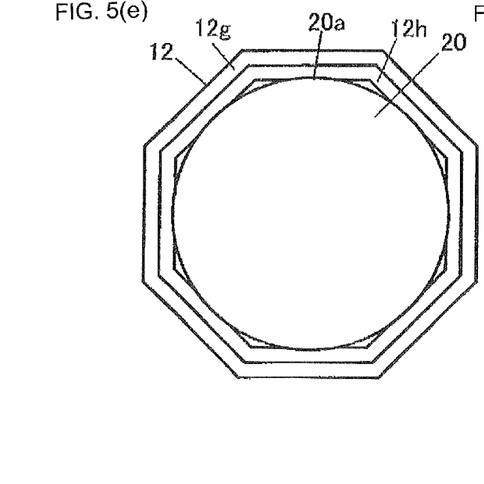
Figure 5F:
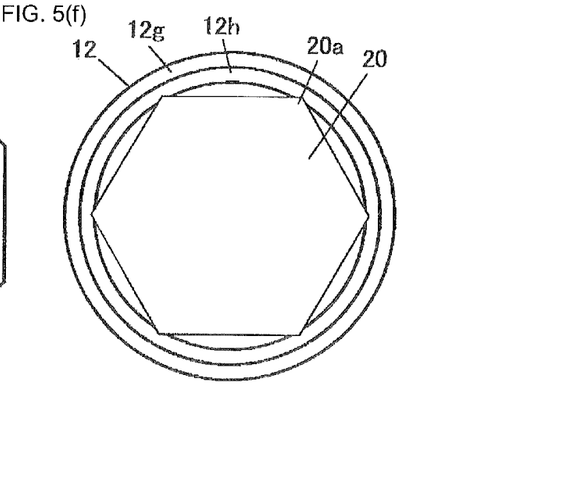

It is shown in FIG. 4 that in the vibration producing device 10 in accordance with the embodiment 2, the micro-vibration producing member 20 has its circumferential edge portion fixed to the casing 12 at the points arranged at equal intervals in the circumferential direction.

The casing 12 is formed into the box shape with no bottom and includes the upper wall 12b having the through hole 12d formed thereon and lined with the bushing 28 through which the driving shaft 22 can be passed so that it can be micro-vibrated.

The lower end portion 12g of the lateral wall 12a has an inner circumferential side whose edge is located by one step above the edge of the outer circumferential side and serves as the fixing portion 12h for the micro-vibration producing member 20.

The micro-vibration producing member 20 has its circumferential edge portion 20a fixed to the fixing portion 12h of the casing 12 at the regularly arranged points (small areas).

In the embodiment 2, as shown in FIG. 5 (a), the casing 12 has the square shape as it is viewed from the bottom, and the micro-vibration producing member 20 has the round shape that enables the four points of the circumferential edge portion 20a to rest on the fixing portion 12h of the casing 12 at small area.

As shown in FIG. 4, furthermore, the circumferential edge portion 20a is formed such that the elastic thin plate 18 has its part extended beyond the flexible thin plate 16 toward the outer circumferential side, and the elastic thin plate 18 is located above and the flexible thin plate 16 is located below. Then, the elastic thin plate 18 including the flexible thin plate 16 is fixed to the fixing portion 12h of the casing 12.

Either the flexible thin plate 16 or the elastic thin plate 18 that is fixed to the fixing portion 12h of the casing 12 may have a part extended toward the outer side as the circumferential edge portion 20a. This allows the electric wires to be disposed on those thin plates easily.

Because the micro-vibration producing member 20 is fixed directly to the casing 12, the driving member 14 can provide the stable driving force. Because the fixing occurs at the regularly arranged points but not over the whole circumferential edge portion 20a, neither the amount of the micro-vibration absorbed by the casing 12 nor the amount of the deformation inhibited by the casing 12 is large, and the driving member 14 can provide the increased driving capability. Furthermore, the weight member 24 that is heavier than that in the embodiment 1 can be moved.

As shown in FIG. 4, furthermore, the fixing portion 12h can have its step that may be formed more deeply than the thickness of the micro-vibration producing member 20, and therefore the micro-vibration producing member 20 can be accommodated by the casing 12 without going out of the lower end portion of the casing 12. This ensures that the micro-vibration producing member 20 will not be destructed by any external force while the vibration producing device 10 is being assembled or after it has been assembled completely.

The mass of the micro-vibration producing member 20 that is located in the region nearer to its circumferential edge portion 20a is so great that the micro-vibration producing member 20 can provide the increased driving capability.

In the vibration producing device 10 in accordance with the embodiment 2, it should be noted that the casing 12 and the micro-vibration producing member 20 can have any combination of the respective shapes or forms other than those which have been described above.

For example, FIG. 5 (b) shows that the casing 12 may have the round shape while the micro-vibration producing member 20 may have the square shape as opposed to those shown in FIG. 5 (a).

FIG. 5 (c) shows that both the casing 12 and the micro-vibration producing member 20 may have the square shape. In this case, the micro-vibration producing member 20 can rest on the fixing portion 12h of the casing 12 such that the four corners of the micro-vibration producing member 20 having the square shape can be supported by the four corresponding side parts of the fixing portion 12h of the casing 12.

FIG. 5 (d) shows that the casing 12 has the octagon shape while the micro-vibration producing member 20 has the square shape.

It may be thought that the octagon shape of the casing 12 in FIG. 5 (d) can be obtained by chamfering the four corners of the casing 12 having the square shape in FIG. 5 (c). Thus, the casing 12 may have the square shape having the rounded corners instead of the octagon shape.

FIG. 5 (e) shows that the micro-vibration producing member 20 in FIG. 5 (d) has the round shape.

FIG. 5 (f) shows that the micro-vibration producing member 20 has the hexagonal shape instead of the round or square shape. The micro-vibration producing 20 may be formed like this.

It may be appreciated from the above description that there are many possible combinations of the shapes or forms for the casing 12 and the micro-vibration producing member 20.

Although this is not shown in FIG. 4, the lateral wall 12a of the casing 12 may have an opening 12f formed thereon as shown in FIG. 2 or FIG. 3.

In the embodiment 2, the casing 12 is formed into the box shape, but it may be formed by bending the single plate as described in the embodiment 1.

In accordance with the embodiment 2 of the present invention, the vibration producing device 10 causes the weight member 24 housed in the casing 12 to be vibrated greatly. This ensures that the casing 12, comprising the vibration producing device 10, can also be vibrated greatly.

The vibrations thus produced on the casing 12 will be transmitted to the electronic device which is equipped with the vibration producing device 10.

The weight member 20, whose size is not so large, can provide the great vibrations. This can make the vibration producing device 10 as small as possible as it is viewed in plane.

Embodiment 3

In accordance with the embodiment 3, other examples of the weight member 24 that has been described in the embodiments 1 and 2 will be described below by referring to FIG. 6 to FIG. 8.

Except for the weight member, the other component parts are the same as those described in the embodiments 1 and 2. The description of the other component parts will be omitted, therefore.

Example 1 of the Weight Member

Figure 6:
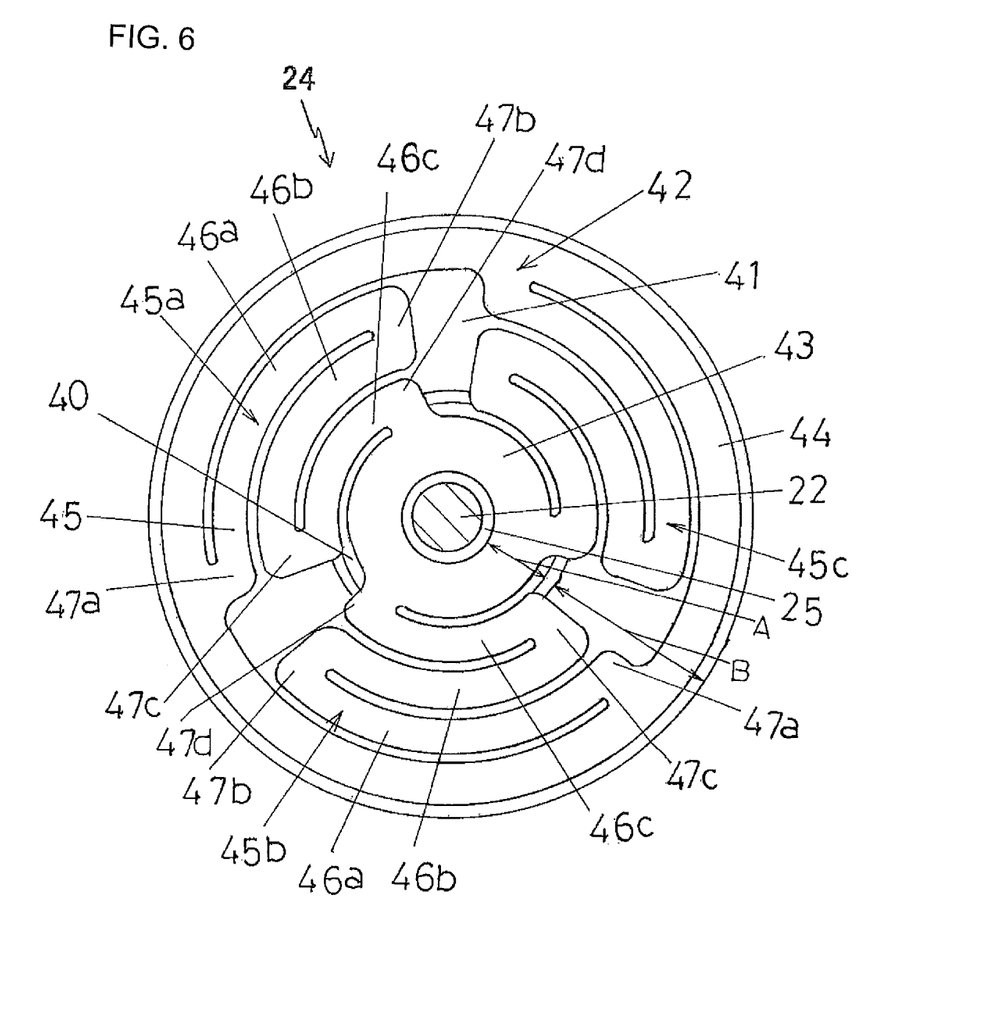
FIG. 6 is a plan view illustrating the weight member in the example 1 of the embodiment 3 of the present invention.

An example 1 of the weight member in the embodiment 3 is now described by referring to FIG. 6.

In the example shown in FIG. 6, the weight member 24 includes an annular support 40, an annular weight portion 41 and a first spring 42. The support 40 is movably coupled with the driving shaft 22. The weight portion 41 is provided as the separate part of the support 40. The first spring 42 is linking the support 40 with the weight portion 41. Specifically, the weight portion 41 formed separately from the support 40 is located outside the support 40 in the radial direction of the driving shaft 22 so that it can be spaced away from the support 40. And the weight portion 41 is linked with the support 40 by means of the first spring 42. More specifically, the weight portion 41 has a through hole formed thereon through which the support 40 can be accepted together with the driving shaft 22. And the support 40 and the weight portion 41 are placed one over the other as they are viewed from the direction orthogonal to the driving shaft 22.

The coupling of the annular support 40 with the driving shaft 22 can be accomplished by the frictional coupling as described in the embodiment 1. The support 40 has a central through hole formed thereon through which the driving shaft 22 can be passed, and the gap that exists between the inner wall of the through hole and the outer wall of the driving shaft 22 is filled with the heat shrinkable resin material 25 that has been heat shrunk. The support 40 of the weight member 24 is coupled with the driving shaft 22 by the heat shrinkable action of the heat shrinkable resin material 25.

A leaf spring may be used as the first spring 42.

The first spring 42 includes a first fixing portion 43 to be fixed to the upper side of the support 40, a second fixing portion 44 to be fixed to the weight portion 41, and a first arm portion 45 elastically linking the first fixing portion 43 with the second fixing portion 44.

In the embodiment shown in FIG. 11, a first arm portion 45 is provided, which includes a plurality of arms such as an arm 45*a*, an arm 45*b* and an arm 45*c*.

In the embodiment shown and described, each of the plurality of arms 45*a*, 45*b* and 45*c* that constitute the first arm portion 45 has a plurality of circumferential parts 46*a*, 46*b* and 46*c* and a plurality of radial parts 47*a*, 47*b*, 47*c* and 47*d*. The circumferential parts 46*a*, 46*b* and 46*c* extend in the circumferential direction around the driving shaft 22 as the center. The radial part 47*a* extends radially around the driving shaft 22 as the center and links the second fixing portion 44 with the circumferential part 46*a* located on the outermost circumference side. The radial parts 47*b* and 47*c* link any two radially adjacent circumferential parts among the circumferential parts 46*a*, 46*b* and 46*c* in the radial direction. The radial part 47*d* extends radially and links the first fixing portion 43 with the circumferential part 46*c* located the innermost circumference side.

The support 40 can move forwards and backwards alternately along the driving shaft 22 in its axial direction by the micro-vibration of the driving shaft 22 moving forwards and backwards alternately and asymmetrically.

During this movement, the weight portion 41, which is located radially outside the support 40 and is spaced away from the support 40, is linked with the support 40 by means of the first spring 42 so that the weight portion 41 can be vibrated greatly in the upward and downward directions in FIG. 1. The vibrations of the weight portion 41 will then be transmitted to the casing 12 so that it can be vibrated.

Using the weight member in the embodiment shown in FIG. 6, it can cause the weight portion 41 to be vibrated greatly by the micro-vibration of the driving shaft 22 moving forwards and backwards alternately and asymmetrically.

It is arranged such that the support 40 is accepted in the through hole on the weight portion 41, and the support 40 and the weight portion 41 are placed one over the other as they are viewed from the direction orthogonal to the axial direction of the driving shaft 22. This arrangement will permit the vibration producing device 10 to be made as thin as possible.

Example 2 of the Weight Member

Another example 2 of the weight member in accordance with the embodiment 3 of the present invention will now be described by referring to FIG. 7. Those structural component parts or elements which are similar to those described in the FIG. 6 are given like reference numerals. The description of those component parts or elements is omitted to avoid the duplicate description.

Figure 7A:
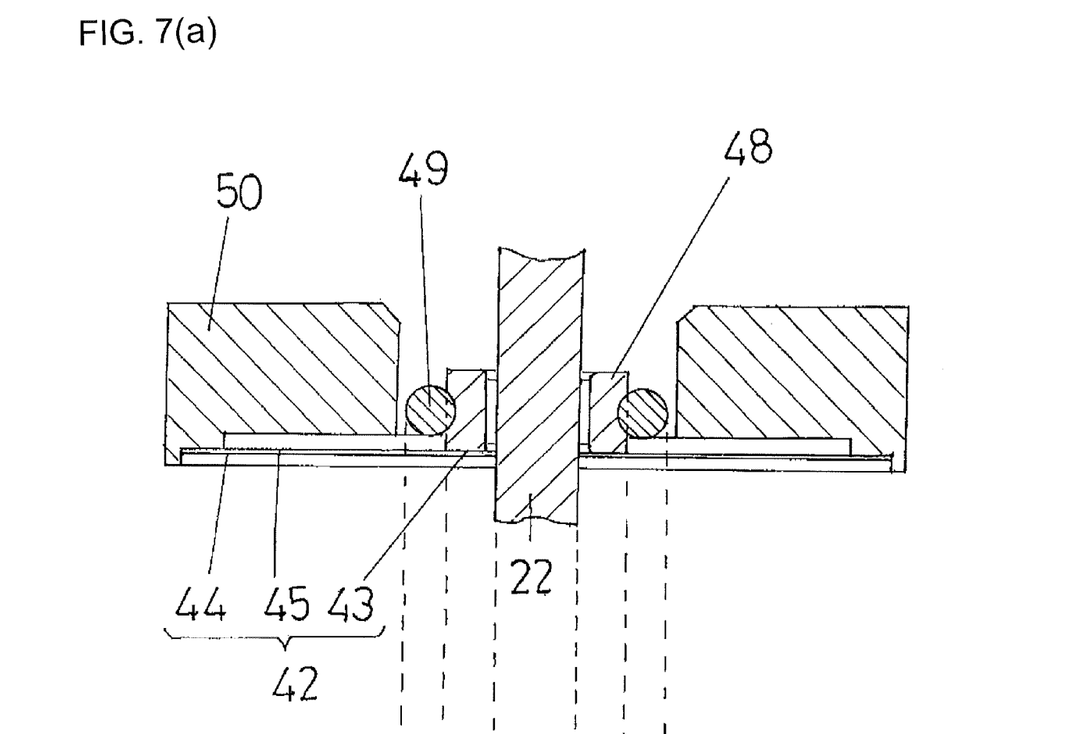

Similarly, the weight member shown in FIG. 7 (*a*) also includes a support 48 and a weight portion 50 which is formed separately from the support 48, the support 48 and the weight portion 50 being linked by means of the first spring 42 so that the weight portion 50 is located outside the support 48 in the radial direction around the driving shaft 22 as the center and is spaced away from the support 48.

The annular support 48 is divided into two divisional parts 48*a* and 48*b* having the similar shape. In the positions of the two divisional parts 48*a* and 48*b* corresponding to the driving shaft 22, there are openings 48*c* and 48*d* so formed as to accept the driving shaft 22 therein. When the two divisional parts 48*a* and 48*b* are rejoined to hold the driving shaft 22 securely therebetween, the side 48*e* of the divisional part 48*a* and the side 48*f* of the divisional part 48*b* that face opposite each other will be joined such that a clearance is created between the two divisional parts 48*a* and 48*b*. Then, the annular support 48 will be frictionally coupled with the driving shaft 22 by pressing the annular support 48 from the outside by means of the annular tightening means 49.

The support 48 may be made of any suitable metal such as a stainless steel, for example. This will increase the durability of the support 48.

It is preferred that the driving shaft 22 and the support 48 should have the line-to-line contact along the axial direction of the driving shaft 22. This enables the driving shaft 22 and the support 48 to be frictionally coupled stably.

The annular tightening means 49, which will be mounted on the outer circumference of the annular support 48 and will be used to tighten the support 48 in the radial direction centered on the driving shaft 22 from the outer circumferential side toward the inner side, may be implemented by a coil spring, for example.

The side 48*e* of the divisional part 48*a* and the side 48*f* of the divisional part 48*b* that are provided to face opposite each other may be tightened together by applying the heat shrinkable resin material between the two sides 48*e* and 48*f* and allowing the applied resin to harden.

Figure 7B:
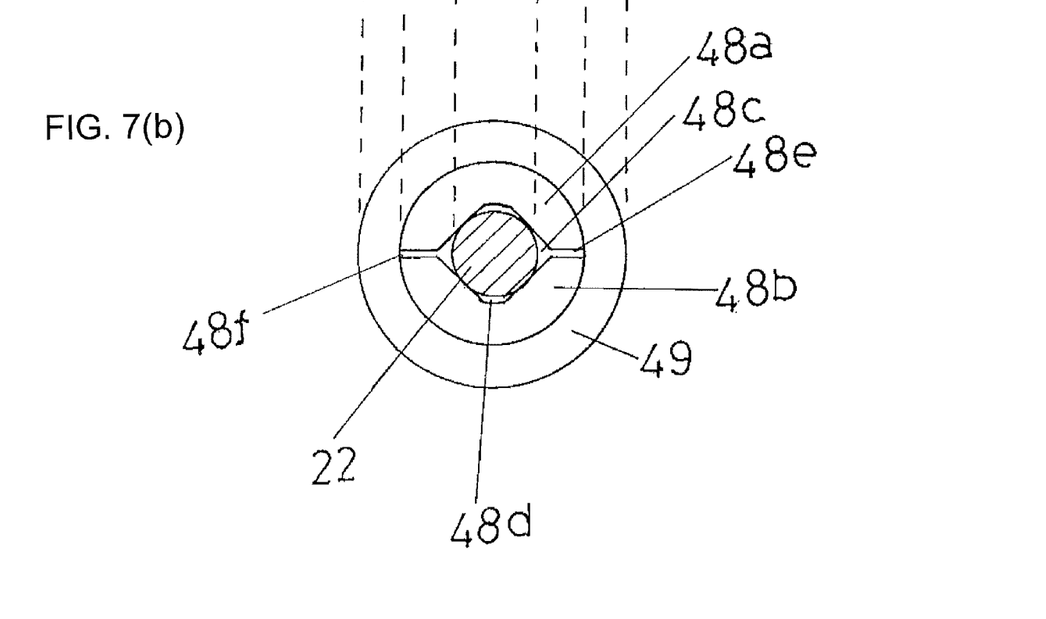

Although FIG. 7 (*b*) shows that the divisional parts 48*a* and 48*b* have the similar shape, they may have a different shape. The support 48 may be divided into three or more divisional parts. For example, the divisional parts 48*a* and 48*b* have the line-to-line contact with the driving shaft 22 in two areas, respectively, but either of those line-to-line contacts may be provided in one area. Furthermore, the driving shaft 22 and the support 48 may have the surface-to-surface contact instead of the line-to-line contact.

The first spring 42 may be implemented by the leaf spring that includes the first fixing portion 43, the second fixing portion 44 and the first arm portion 45 that have been described in the embodiment shown in FIG. 7.

In the embodiment shown in FIG. 7, the first fixing portion 43 is fixed on the lower side axially of the support 48, but may be fixed on the upper side axially of the support 48.

Example 3 of the Weight Member

Figure 8:
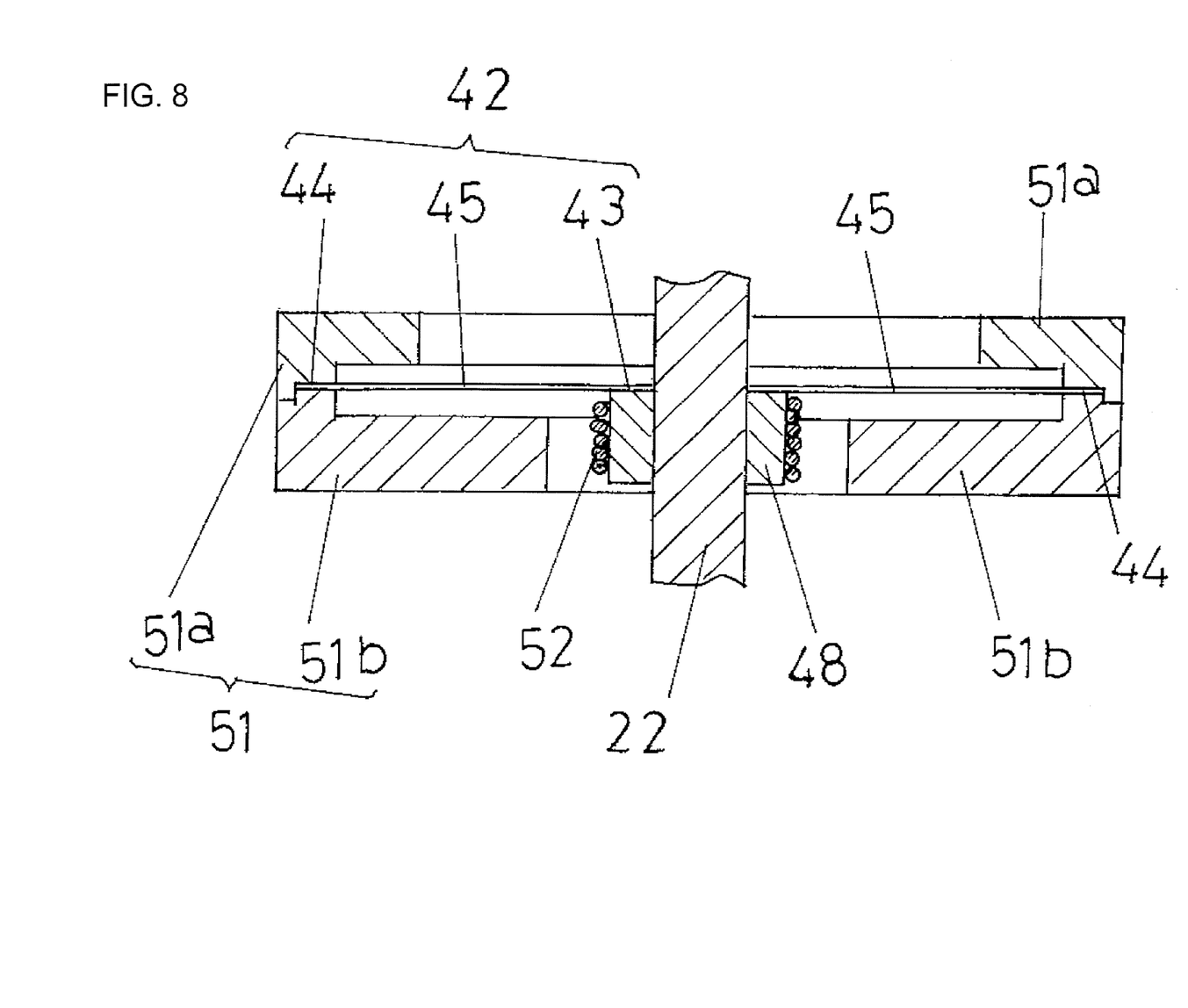
FIG. 8 is a longitudinal sectional view illustrating the example 3 of the weight member in accordance with the embodiment 3 of the present invention.

Still another example 3 of the weight member in the embodiment 3 of the present invention is now described by referring to FIG. 8. Those structural component parts or elements which are similar to those described in the embodiments in FIG. 6 and FIG. 7 are given like reference numerals. The description of those component parts or elements is omitted to avoid the duplicate description.

The annular tightening means 49, which will be mounted on the outer circumference of the annular support 48 and will be used to tighten the support 48 in the radial direction centered on the driving shaft 22 from the outer circumferential side toward the inner side, may be implemented by a coil spring 52.

In the embodiment shown in FIG. 8, the first fixing portion 43 of the first spring 42 is fixed on the upper side axially of the support 48.

In the embodiment shown in FIG. 8, the weight portion 51 is divided into two divisional parts in the axial direction of the driving shaft 22. The second fixing portions 44 of the first spring 42 is held securely between those two divisional parts 51*a* and 51*b* of the weight portion 51.

The weight portion 51 including the two divisional parts 51*a* and 51*b*, which is located outside the support 48 in the radial direction centered on the driving shaft 22 and is spaced away from the support 48, will have the weight that is heavier than the case where the weight portion is comprised only by divisional parts 51*a* or 51*b*.

In the embodiment shown in FIG. 8, the weight portion 51 includes two divisional parts 51*a* and 51*b*, so that the weight portion 51 can be vibrated more greatly by the micro-vibration of the driving shaft 22 moving forwards and backwards alternately and asymmetrically.

In accordance with the embodiment 3 of the present invention, the weight member inside the casing 12 comprised in the vibration producing device 10 can be vibrated greatly. This will permit the casing 12 comprised in the vibration producing device 10 to be vibrated greatly.

The vibrations thus produced on the casing 12 will be transmitted to the electronic device that is equipped with the vibration producing device 10.

As it is apparent from the above, the weight member 12 can provide the great vibrations although it is not so large in size. Thus, the vibration producing device 10 can be made as small as possible as it is viewed in plane.

Embodiment 4

Figure 9:
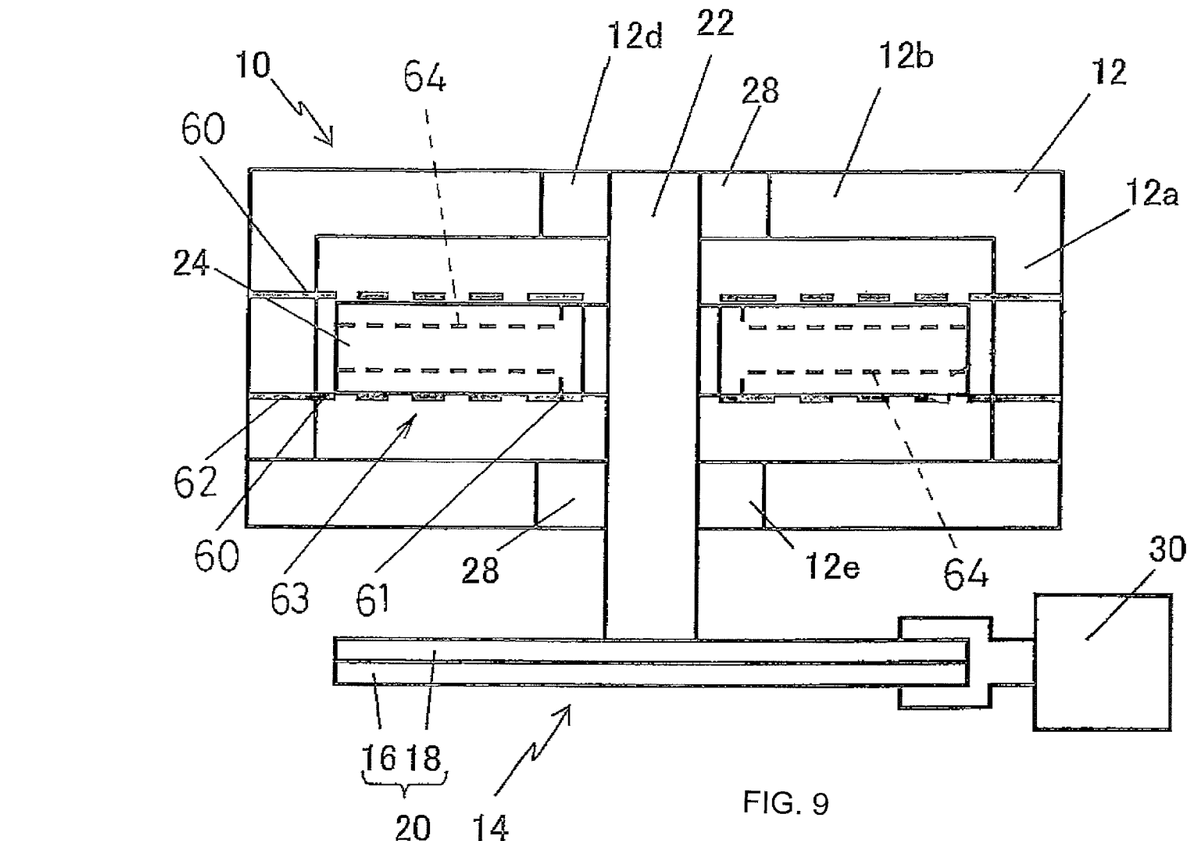
FIG. 9 is a longitudinal sectional view illustrating the structure of the vibration producing device in accordance with the embodiment 4 of the present invention.

The vibration producing device 10 in accordance with the embodiment 4 is now described by referring to FIG. 9. Those structural component parts or elements which are similar to those described in the embodiments 1 and 2 are given like reference numerals. The description of those component parts or elements is omitted to avoid the duplicate description.

The weight member 24 that may be used in this embodiment 4 may be the same as the weight member 24 described in the embodiments 1 and 2.

As for the embodiments 1 and 2, the weight member 24 is coupled with the driving shaft 22 so that the weight member 24 can be moved in the axial direction of the driving shaft 22 by the micro-vibration of the driving shaft 22 moving forwards and backwards alternately and asymmetrically. In the current embodiment 4, the weight member 24 may be provided to determine the stroke of the movement of it in the axial direction of the driving shaft 22 by the elastic force of the second spring 60.

The second spring 60 includes a third fixing portion 61 to be fixed to the weight member 24, a fourth fixing portion 62 to be fixed to the casing 12 and a second arm 63 linking the third fixing portion 61 with the fourth fixing portion 62.

Structurally, the third fixing portion 61 and the fourth fixing portion 62 correspond to the first fixing portion 43 and the second fixing portion 44 included in the first spring 42 described in the embodiment 3, respectively.

The structure or arrangement of the second arm 63 in the second spring 60 may be the same as that of the first arm 45 in the first spring 42 described in the embodiment 3, respectively.

In the example shown and described, the second spring 60 includes two springs each mounted above and below axially of the driving shaft 22.

As shown, the third fixing portion 61 in the second spring 60 may be arranged radially inwardly of the weight member 24, and on the upper and lower sides of the weight member 24 in the axial direction of the driving shaft 22.

Structurally, the fourth fixing portion 62 is fixed to the lateral wall 12*a* of the casing 12 such that it can be located radially outwardly of the weight member 24.

In the example shown and described, it is apparent from the above described structure that the weigh member 24 has a depressed portion 64 formed on each of the upper and lower sides thereof in order to ensure that the stroke can be determined by the second spring 60 during the vibrating.

In accordance with the embodiment 4 of the present invention, the weight member 24 can only be moved to the position where the urging force of the second spring 60 and the driving force of the driving member 14 are equal even if the weight member 24 is moved upwardly or downwardly in the axial direction of the driving shaft 22 by the micro-vibration of the driving shaft 22. For this reason, the weight member 24 will be prevented from hitting against the casing 12. And, the weight member 24 can be vibrated greatly inside the casing 12 which comprised in the vibration producing device 10. This allows the casing 12 which comprised in the vibration producing device 10 to be vibrated as greatly.

The vibrations produced on the casing 12 will be transmitted to the electronic device equipped with the vibration producing device 10.

As the weight member 24, which can be kept as small as possible, can provide the great vibrations, the vibration producing device 10 can also be made as small as possible.

It is apparent from the embodiment 3 of the present invention that the supports 40, 48 and the weight portions 41, 50, 51 are coupled by means of the first spring 42, but they may be coupled by means of just a flat plate.

It is also apparent that the support 48 that is divided into several divisional parts is used, but the support and the weight portion included in the weight member 24 may be provided in the form of a single unit which may be divided into several divisional parts. Then, the driving shaft 22 may be held securely between those divisional parts and tightened from the outer circumferential side.

As it is apparent from the embodiments 1 to 4 of the present invention, the micro-vibration producing member 20 may be configured as the unimorph or bimorph form, but this is not limitative. It may be provided as the multilayered form. As the driving shaft 22 can be driven with the small driving voltage, the drive control portion 30 can be manufactured at the less cost.

The electronic device equipped with the vibration producing device 10 has been described in accordance with the specific embodiments of the present invention. It is not limited to any type of the electronic device such as the display having the touch panel function integrated therein or the input unit using the operating keys. As one typical example, the vibration producing device 10 may be integrated in the touch pen used as the input to the touch panel display. As another typical example, it may be integrated in the wrist watch.

In addition to the electronic device that has been described so far herein, the vibration producing device 10 may be integrated in the human body fitting article such as the finger ring, broach, bandanna and the like.

What is claimed is:

1. A vibration producing device which comprises:
   a driving shaft being placed under the slight rapid vibratory movements in its axial direction;
   a slight rapid vibratory movements producing member coupled with one end of said driving shaft for causing said driving shaft to be vibrated with the slight rapid vibratory movements;
   a casing for supporting at least either said driving shaft or said slight rapid vibratory movements producing member in order to permit said driving shaft to be vibrated with the slight rapid vibratory movements in its axial direction; and
   a weight member to be coupled with said driving shaft so as to be movable in the axial direction of said driving shaft by causing said driving shaft to be placed under said slight rapid vibratory movements,
   wherein said weight member allows said casing to produce the vibration by moving forwards and backwards along the axial direction of said driving shaft.

2. The vibration producing device as defined in claim 1, wherein said weight member includes a support to be coupled with said driving shaft, a weight portion constructed as the separate form of said support, and a first spring linking said support with said weight portion, wherein said first spring includes a first fixing portion to be fixed to said support, a second fixing portion to be fixed to said weight portion, and a first arm portion elastically linking said first fixing portion with said second fixing portion.

3. The vibration producing device as defined in claim 2, wherein said weight portion is divided into at least two divisional parts along with the axial direction of said driving shaft and said second fixing portion is held securely between those two divisional parts.

4. The vibration producing device as defined in claim 2, wherein said first arm portion includes a circumferential direction part extending in the circumferential direction about said driving shaft and a radial direction part extending in the radial direction about said driving shaft and to be coupled with said circumferential direction part.

5. The vibration producing device as defined in claim 2, wherein said weight portion has a through hole formed thereon for accepting said support together with said driving shaft therethrough and wherein said support and said weight portion are placed one over the other as they are viewed from the direction orthogonal to the axial direction of said driving shaft.

6. The vibration producing device as defined in claim 1, wherein said weight portion has a through hole formed thereon for accepting said driving shaft therethrough and wherein the gap that exists between an inner wall of said through hole and an outer wall of said driving shaft is filled with any heat shrinkable resin material that has been heat shrunk so that the said weight portion is coupled with said driving shaft under the heat shrinkable action of said heat shrinkable resin material.

7. The vibration producing device as defined in of claim 2, wherein said support includes a deformable annular portion to be coupled with said driving shaft and an annular tightening means for tightening said annular portion from the outer circumferential side.

8. The vibration producing device as defined in claim 1, further including a third fixing portion to be fixed to said weight portion, a fourth fixing portion to be fixed to said casing, and a second spring having a second arm linking said third fixing portion with said fourth fixing portion wherein said weight portion is prevented from hitting against said casing by elastic action of said second spring.

9. The vibration producing device as defined in claim 1, wherein said slight rapid vibratory movements producing member is supported by said casing through said driving shaft.

10. The vibration producing device as defined in claim 1, wherein said slight rapid vibratory movements producing member has its circumferential edge portion fixed to said casing at the points arranged at equal intervals in the circumferential direction.

11. The vibration producing device as defined in claim 1, wherein said slight rapid vibratory movements producing member is formed from a thin plate, said thin plate including an elastic thin plate and a flexible thin plate disposed on at least one side of said elastic thin plate and wherein said thin plate is deformed so that the center portion and circumferential edge portion of said flexible thin plate can be displaced relative to each other in the normal direction of said elastic thin plate by causing said flexible thin plate to expand or contract itself when a driving voltage is applied across said flexible thin plate.

12. An electronic device wherein it is equipped with the vibration producing device as defined in claim 1.

13. A human body fitting article wherein it is equipped with the vibration producing device as defined in claim 1.

* * * * *